United States Patent [19]

Dougall

[11] Patent Number: 4,969,360
[45] Date of Patent: Nov. 13, 1990

[54] SYSTEM FOR MEASURING THE CYCLIC SPEED AND ROTATIONAL POSITION OF A TRAVELING LOOPED BELT

[75] Inventor: Ryan P. Dougall, Roscoe, Ill.

[73] Assignee: Beloit Corporation, Beloit, Wis.

[21] Appl. No.: 416,297

[22] Filed: Oct. 2, 1989

[51] Int. Cl.⁵ .............................................. G01P 3/26
[52] U.S. Cl. ...................................... 73/521; 73/37.7
[58] Field of Search ................. 73/37, 37.6, 37.7, 521, 73/506; 137/803

[56] References Cited

U.S. PATENT DOCUMENTS

| | | |
|---|---|---|
| 2,786,978 | 3/1957 | Warner . |
| 2,919,673 | 1/1960 | Williams et al. . |
| 3,754,471 | 8/1972 | Hohenberg ........................ 73/521 X |
| 4,602,510 | 7/1986 | Mon ................................. 73/521 X |
| 4,652,736 | 3/1987 | Osterberg . |
| 4,848,632 | 7/1989 | Mack et al. . |

FOREIGN PATENT DOCUMENTS 35587  4/1978  Japan ..................................... 73/521

Primary Examiner—Hezron E. Williams
Assistant Examiner—Joseph W. Roskos
Attorney, Agent, or Firm—Dirk J. Veneman; Raymond W. Campbell; Gerald A. Mathews

[57] ABSTRACT

A system for determining the rotational, or cyclic, speed and rotational position of a looped traveling belt, such as a felt in a papermaking machine, utilizes a discontinuity, or caliper variation, in the surface of the belt near one edge thereof. A fluid stream, such as compressed air, is projected against the web along the annular area containing the discontinuity, and a pressure transducer is mounted to fixed proximity with the belt downstream of, and aligned with, the fluid stream. The transducer senses differences in the pressure of the fluid stream projected against the belt and against the discontinuity, and produces a signal indicative of the passage of the discontinuity past the transducer. The time interval of this signal is used to compute the cyclic speed of the traveling belt and to identify the part of the belt passing through a nipped roll couple at another location.

3 Claims, 2 Drawing Sheets

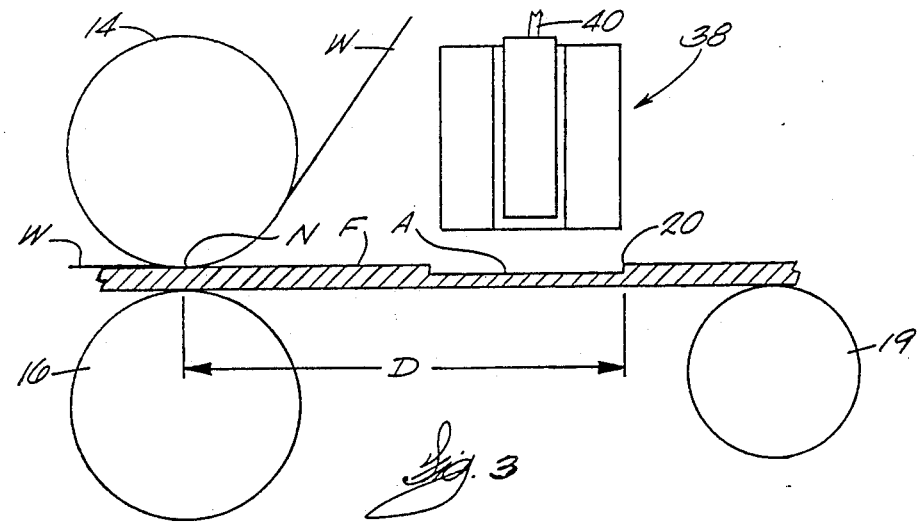
Fig. 3
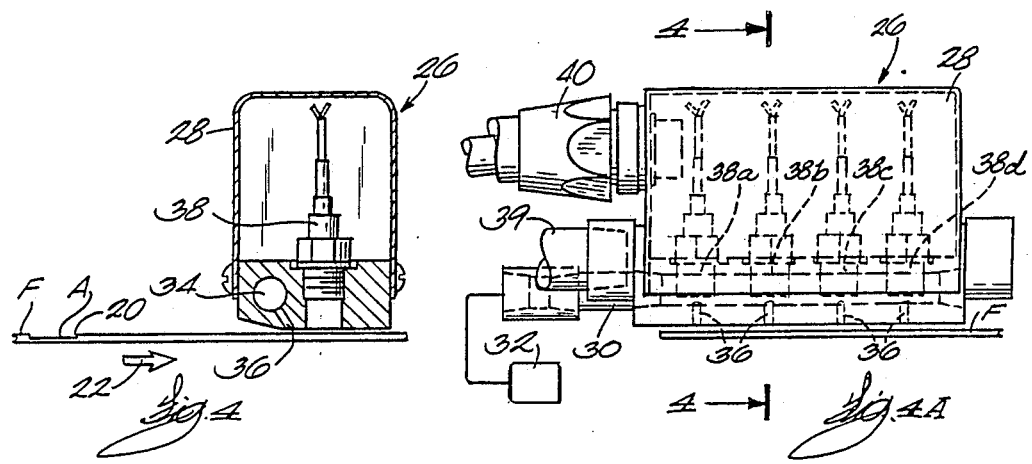
Fig. 4
Fig. 4A
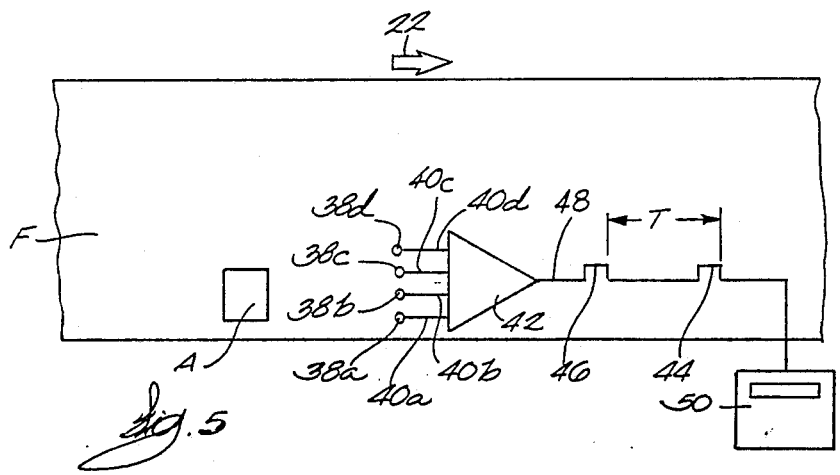
Fig. 5

SYSTEM FOR MEASURING THE CYCLIC SPEED AND ROTATIONAL POSITION OF A TRAVELING LOOPED BELT

BACKGROUND OF THE INVENTION

1. Field of the Invention

This invention relates to the measurement of the speed of a traveling looped belt. More specifically, this invention relates to the measurement of the speed of a somewhat elastic belt, such as a papermaking felt, and to the accurate determination of the rotational position of specific portions of such a felt. Still more specifically, this invention relates to the measurement of the cyclic speed and rotational position of a papermaking felt by producing an area of discontinuity, or caliper variation, in the surface of the felt and bringing the discontinuity into spaced adjacency with a source of fluid pressure and means for measuring changes in the fluid pressure near the surface of the felt as the discontinuity passes in close proximity with the means for measuring fluid pressure changes.

2. Description of the Prior Art

In papermaking machines, looped felts are used to dewater the paper web being formed by passing with the web through a nip between two rolls. The water expressed from the web is received by the felt in the nip and removed subsequently by other equipment, which may include the press rolls. Felts are also used in the dryer section of a papermaking machine, but they typically do not pass through nipped rolls.

Regardless of where felts are used in papermaking machines, they become worn with use over a period of time. They also tend to stretch with both the absorption of water and wear. Such wear tends to produce irregularities in the felt, such as corrugations.

In modern papermaking machines, with speeds commonly about 1,000-1,500 meters per minute, and design speeds even higher, it is important that all sources of vibration and roll bounce be eliminated, or at least diminished, and all aspects of felt condition be monitored to ensure the production of a quality sheet of paper at high speeds. The production of a quality paper sheet at relatively low speeds can be accomplished without encountering, must less recognizing, many of the problems which arise when the same quality paper is required at increased production speeds. In today's marketplace, the production of a quality product at high speeds is essential to be economically competitive.

In order to produce a quality paper sheet product at high speeds, the force between nipped rolls against the web and felt passing therebetween must be increased. As the felt wears, corrugations develop in it which produce vibrations which tend to produce imperfections in the wet paper web as it is being processed. In addition, such vibration over time tends to create imperfections in the covers of the rolls nipping the felt and web. Damaged roll covers have to be replaced more frequently. The felt corrugations and roll cover imperfections exacerbate the imperfections and non-uniformities in the paper web being produced and the frequency of their creation.

It is therefore of great importance that machine runnability be maintained at a uniformly high level; that timely maintenance be conducted on the various components of the papermaking machine, such as felt replacement and roll cover conditioning, and overall optimization of the quality operation of the papermaking machine from the headbox to the reel be maintained at a high level.

Accordingly, felt wear and deterioration, and their effect on vibration and roll bounce, are important operating parameters necessary to predict maintenance of the papermaking machine components and to correlate other operating parameters, such as headbox pulsations, comparing basis weight measurements of the paper sheet at the reel and controlling pressure surges in the forming area of the papermaking machine.

For example, if the felt is becoming corrugated to a slight extent which is not detectable by the human eye, but which nevertheless is affecting water removal, machine direction caliper control, or nip vibration, in the press section, the press nip, or nips, can be adjusted slightly, or the machine speed can be increased or decreased slightly, or the angle at which the felt passes through the nip can be changed slightly to eliminate or, at least, mitigate variations in the caliper, the extent of nip bounce, water removal in the press nips and the rate and location of water removal and stock surges in the forming section. These are only some of the adjustments which can be made to produce a more uniform, high quality paper sheet.

In order to both accurately determine the source and extent of such imperfections, variations and non-uniformities in the paper product, it is very important that the cyclic speed of the somewhat elastic and deformable felt be measured accurately. It is also important to know the exact part of the felt which is passing through a press nip when instruments operatively linked to the nipped rolls indicate an undesirable phenomenon is occurring, such as roll bounce or nip vibration. In the past, attempts to measure the felt speed by measuring the rotational speed of the rolls, such as press and felt rolls, contacting the felt have not proved reliable. The elasticity, floppiness and deformability of the web simply made determinations of its speed based on the rotational speed of the rolls coming into contact with the felt inaccurate to the extent necessary to make calculations necessary to adjust other operating parameters. Further, merely measuring roll speed is ineffective in trying to identify with precision the exact part of the felt passing through a nip when vibration occurs.

Prior methods of measuring the web cyclic speed also included optical methods which utilized a mark on the surface of the felt which was read by an optical scanner. As the felt became more worn and filled with contaminants, such as fines, pulp fibers, pitch, ink, clay and dirt, the demarkation between the mark on the felt and the unmarked portion of the felt became blurred and the optical scanners could not provide accurate indications of when, to the required time tolerances, the mark passed the scanner.

SUMMARY OF THE INVENTION

The problems associated with the inaccurate measurement of the cyclic speed and position of the traveling looped felt in a papermaking machine have been mitigated by this invention. The felt has a relatively small, such as a 12 cm×12 cm square, area which is shaved to remove the nap and produce a sharply defined caliper (thickness) variation in the felt as compared with the felt caliper at other locations. The exact size and shape of the caliper variation, which might also be referred to as a surface discontinuity, is not important. What is important is that the leading edge of the discontinuity be substantially at right angles to the direction of felt travel in the machine direction and that the discontinuity, particularly its leading edge, be as sharply defined as possible. The machine direction length of the discontinuity need only be as long as required to produce a signal in a transducer, as will be described later. Further, while the preferred embodiment of the discontinuity is in the form of a shaved depression in the nap of the felt, it is anticipated that the discontinuity could be represented by some form of raised portion of the nap, although this would not be expected to operate as well over a period of time due to the flattening such raised portion would experience during continuous passes through a press roll nip.

The use of a shaved depression in the felt also precludes the problems which might otherwise be associated with notching or perforating the felt, such as creating localized areas of decreased tension if the strength bearing woven backing, or screen, were to be cut out or weakened.

A source of fluid pressure, such as compressed air, is directed by a nozzle against the traveling felt while both the felt and nozzle are maintained at a fixed distance from one another. The compressed air directed against the traveling felt produces a small, localized boundary layer of pressurized air over, and traveling with, a portion of an annular region of the traveling felt including the region over the caliper variation, or shaved depression area, in the felt. A pressure transducer is maintained in fixed, spaced adjacency with the traveling felt in line with the stream of compressed air and the caliper variation as the felt travels in its continuous, looped path in the machine direction.

The distance between the transducer and the surface of the felt is less than the distance between the transducer and the surface of the shaved nap area of the caliper variation. This means the volume of the space immediately above the caliper variation area is greater than the volume of an identical area over the felt surface. The pressure of the air in the volume over the caliper variation area will therefore be less than the pressure over the same size area of the felt immediately upstream of the area of caliper variation.

The transducer detects the variation in air pressure between the air over the surface of the felt and the air over the caliper variation. This enables the pressure transducer to produce an immediate signal that the caliper variation area has passed beneath the transducer. This signal is then sent to a conditioning circuit which produces a signal sent to a display monitor indicative of the cyclic speed of the traveling felt as well as the exact position of the caliper variation.

This enables the exact location of a specific portion of the felt passing through a press nip, for example, at some other location in the looped felt to be determined. In the case where roll bounce or vibration of one or both of the press rolls is being measured, such accurate information as the exact location of the felt passing through the nip at a given reading of the roll bounce or vibration is important in determining the condition of the felt, such as the presence and extent of corrugations, and whether such condition can be modified, such as increasing or decreasing the speed of the machine, or whether the felt needs replacing or to be canted.

Accordingly, it is an object of this invention to provide a method and apparatus for accurately measuring the cyclic speed, and position of a desired circumferential location, of a traveling felt in a papermaking machine.

Another object of this invention is to provide a positive, non-optical way of measuring the cyclic speed of a traveling felt in a papermaking machine.

A feature and advantage of this invention is that the cyclic speed of the traveling papermaking felt can be determined regardless of the condition of the felt and by means which do not utilize contact with the felt, or require the felt to be perforated or notched.

These and other objects, features and advantages of this invention will become more readily apparent to those skilled in the art when the following description of the preferred embodiments are read in conjunction with the attached drawings.

BRIEF DESCRIPTION OF THE DRAWINGS

FIG. 3 is a side-elevational view of the felt paper web, press roll couple and a schematic depiction of the transducer.

FIG. 4 is a side-elevational view, partially in section, of the fluid pressure stream nozzle and pressure transducer spaced above the felt.

FIG. 4A is an elevational view, looking upstream, of the apparatus shown in FIG. 4.

FIG. 5 is a plan view of the felt showing the area of caliper variation and schematically showing four pressure transducers, the signal conditioner, the wave form signal and the display monitor.

DESCRIPTION OF THE PREFERRED EMBODIMENT

Figure 1:
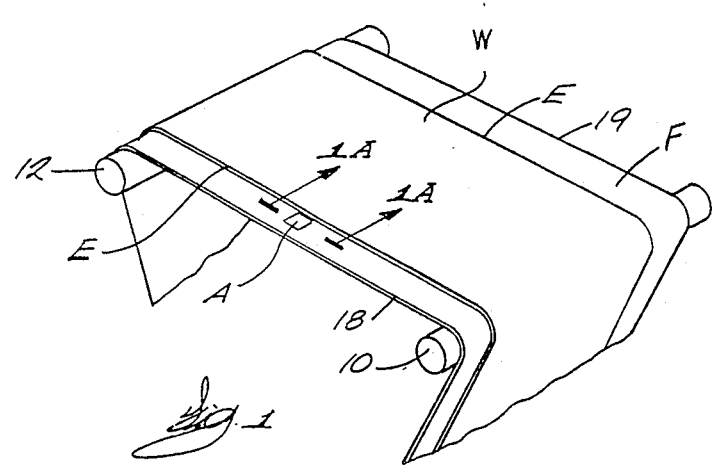
FIG. 1 is a perspective view showing a papermaking felt looped over two felt turning rolls and showing the area of caliper variation.
Figure 1A:
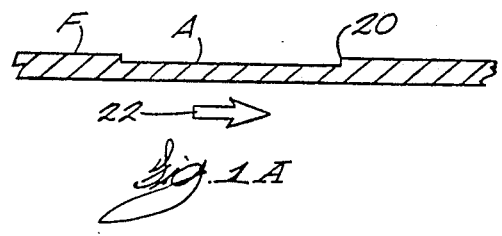
FIG. 1A is a cross-sectional view of the section A-A of the felt in FIG. 1 showing the cross-sectional view of the area of caliper variation.

With reference to FIGS. 1 and 1A, a continuous, looped papermaking felt F is disposed about two felt turning rolls 10,12. Typically, such a felt would pass through a press nip N together with the paper web W between two co-running press rolls 14,16 as shown in FIG. 3. The edges E of the paper web carried on the felt are disposed inwardly of the edges 18,19 of the felt.

Spaced inwardly a short distance from the edge 18 of the traveling felt F, but outside the paper web—or where the paper web would be, is a relatively small area A created by shaving the nap of the felt downwardly into, but not through, the strength bearing weave of the felt. This shaved nap area is intended to be relatively small, such as a square or rectangle having one side edge 20 disposed perpendicular to the machine direction of travel as indicated by arrow 22. The machine direction length of the shaved area need only be long enough to enable a pressure transducer to sense variations in the pressure of the air over the shaved area compared to the unshaved area of the felt as will be explained in more detail subsequently.

Figures 2, 2A:
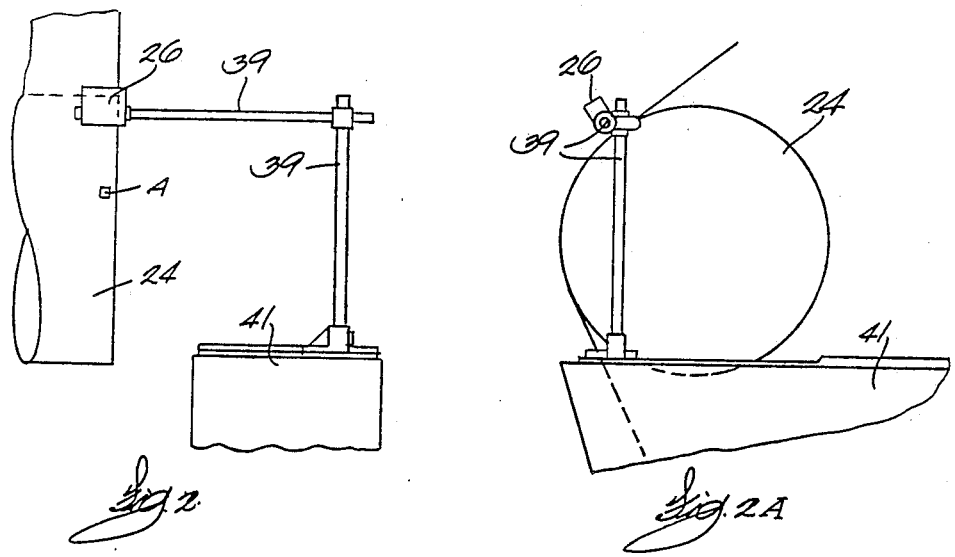
FIG. 2 is an elevational view in the machine direction of the edge of a roll over which the felt is disposed and showing the fluid stream projection and the pressure sensor.
FIG. 2A is an end-elevational view of the apparatus shown in FIG. 2.

Referring to FIGS. 2 and 2A, the felt is shown passing over a turning roll 24, such as if it was the lower felt in a double-felted press section of a papermaking machine. Spaced above the felt over the periphery of roll 24, at a point where the felt is tangent to the roll, is fixedly mounted a pressure sensor 26. The area A of caliper variation of the felt is shown upstream of the pressure sensor 26 which comprises one or more pressure transducers as will be explained subsequently.

As shown in more detail in FIGS. 4 and 4A, pressure sensor 26 comprises a housing 28 to which a pipe 30 is connected and to which a source, such as an air fan 32, of pressurized air is connected to provide air in chamber 34 extending across the sensor. A nozzle 36 leads from the chamber 34 downwardly to the felt F. A bracket 39 mounts the sensor 26 to the machine framework 41. Also mounted in the housing are several pressure transducers 38a,38b,38c,38d arrayed to extend in the cross-machine direction parallel with the leading edge 20 of the shaved area of the felt. The electrical leads 40a,40b,40c,40d from the respective pressure transducers, shown more clearly in FIG. 5, lead to a conditioning circuit 42 where their signals are added together and used to produce a pulse signal 48, the pulses of which are shown schematically as 44,46 in FIG. 5. The time interval between the pulse signals is indicated by the letter T.

In operation, the felt is moving in its looped path of travel in the machine direction 22. At some location in its looped path of travel, the felt is supported in its plane of travel, or over the surface of a roll, against any significant motion in a direction normal to its direction of travel. Such a position might typically be over the surface of a roll at a point where the felt is tangentially leaving the roll, such as shown in FIG. 2A, or at a point where the felt is stretched between two support elements, such as over two adjacent rolls 16,19, which is shown in FIG. 3. All that is important is that the felt be restrained from vibration or motion perpendicular to its path of travel.

The shaved nap area A of the felt represents a sharply defined area of caliper variation in the web which is aligned with, and passes beneath, the plurality of aligned pressure transducers 38 which are aligned perpendicular to the direction 22 of web travel. A plurality of pressure transducers 38 are utilized to ensure that a signal is provided regardless of any lateral migration of the felt F in the cross-machine direction during operation. In other words, the area of caliper variation, or surface discontinuity, of the felt will pass beneath at least one of the laterally disposed pressure transducers 38. The pressurized air in chamber 34 within the cover 28 for the electrical wiring is directed through one or more slot nozzles 36 to impinge a fluid stream upon the felt immediately upstream of the arrayed pressure transducers. This produces a pressurized cushion of air over the web and which travels with the web, the pressure of which is detectable by the pressure transducers. This provides a steady state pressure threshold reading to the conditioning circuit 42. When the caliper variation represented by the surface discontinuity of the shaved area A in the nap of the felt, as first represented by the leading edge 20 thereof, passes beneath the stream of pressurized air emitting from nozzle 36, the space beneath the nozzle is momentarily enlarged and therefore it can accommodate more air. This momentarily enlarged volume passing beneath the stream of pressurized air momentarily reduces the pressure over the area A and this sudden, localized decrease in air pressure is detected by one or more of the pressure transducers 38a,38b, 38c,38d under which the area A passes.

The pressure transducers, which operate on the piezoelectric principle, produce an electrical signal which is added from each pressure transducer and sent to the conditioning circuit via leads 40a, 40b, 40c, 40d which produces a signal 48 responsive to the signal from the pressure transducers. Pulses 44,46 represent successive passes of the area A beneath the pressure transducers, enables the cyclic time interval T to be calculated by the conditioning circuit 42 and passed to the monitor system 50 for display.

Since the distance D between the leading edge 20 of the area A of caliper variation and the nip line of contact N between the press rolls 14,16, is known, the condition of the felt at a specific rotational position in the felt can be determined and correlated with vibration in the nip or other phenomena, such as roll bounce, which is measured by other instruments. This allows the papermaker to determine with great accuracy whether roll bounce or nip vibration is being caused by irregularities or discontinuities, such as corrugations, in the felt, and such characteristics can be analyzed and corrected. For example, the readings from many successive passes of a particular position (location) of the felt passing through a press nip can be averaged over time and analyzed with various mathematical techniques to determine if the cause is in the felt, the rotating rolls or some other source.

While the preferred embodiment of the invention has been described, various modifications have been contemplated, or will be clear to those skilled in the art. For example, while the nap in the functional surface of the papermaking felt has been described as being shaved to form the defined area of caliper variation, it is conceivable that the surface of the other side of some belts, or felts, could be shaved and the pressure transducer also arrayed on the same side. Also, if the area of caliper variation is deep enough, it is possible that the cushion of air, or fluid stream, traveling with the felt under the impetus of the moving felt would vary enough between the reference, or napped, surface of the felt and the area over the caliper variation that the pressure transducer could detect the differences in pressure over the two areas without an additional stream of pressurized air provided by a nozzle. In other words, the impingement pressure of the air would be provided by the movement of the air cushion with the felt.

Accordingly, the examples of the embodiments described are not intended to limit the invention which is limited only by the scope of the claims.

What is claimed :

1. Apparatus for measuring the cyclic speed and rotational position of a traveling looped felt having inner and outer surfaces comprising, in combination:
    felt support means for supporting at least a portion of the felt in its path of travel where the supported surfaces are maintained substantially stable in the direction normal to its surface;
    a shaved area of caliper variation in a napped surface of the felt near one edge thereof;
    fluid stream impingement means associated with the traveling felt, aligned over the annular portion containing the area of caliper variation and providing a cushion of pressurized fluid over the felt;
    pressure sensor means in spaced adjacency with the selected surface of the felt containing the area of caliper variation, and aligned therewith in the direction of felt travel;

the pressure sensor means including fluid stream pressure sensitive means for detecting the difference in fluid pressure over the felt area containing the area of caliper variation and a downstream portion of the felt not containing the area of caliper variation, said pressure sensitive means producing a signal indicative of the passage of the area of caliper variation past the pressure sensitive means; and signal conditioning means for receiving the signal from the pressure sensitive means and utilizing the signal to determine the cyclic speed of the felt and the rotational position of a predetermined position of the felt in its looped path of travel.

2. Apparatus for measuring the cyclic speed and rotational position of a traveling looped papermaking felt having inner and outer surfaces comprising, in combination:

felt support means for supporting at least a portion of the felt in its path of travel where the supported surfaces are maintained substantially stable in the direction normal to its surface;

a defined area of caliper variation in one of the otherwise continuous surfaces of the felt near one edge thereof, said defined area of caliper variation extending into, but not through, the felt;

fluid stream impingement means, including a supply of pressurized air and nozzle means for distributing the pressurized air, arrayed in spaced adjacency with a selected surface of the traveling felt, aligned over the annular portion of the felt containing the area of caliper variation and providing a cushion of pressurized air over the felt;

one or more pressure transducers arrayed in spaced adjacency with the selected surface of the felt containing the area of caliper variation, downstream of the nozzle means and aligned therewith in the direction of felt travel;

each pressure transducer producing a signal indicative of the passage of the area of caliper variation past the pressure transducer means; and signal conditioning means for receiving the signal from the pressure transducer means and utilizing the signal to determine the cyclic speed of the belt and the rotational position of a predetermined position of a belt in its looped path of travel.

3. Apparatus for measuring the cyclic speed and rotational position of a traveling looped felt having inner and outer surfaces comprising, in combination:

felt support means for supporting at least a portion of the felt in its path of travel where the supported surfaces are maintained substantially stable in the direction normal to its surface;

a shaved area of caliper variation in a napped surface of the felt and near one edge thereof;

fluid stream impingement means associated with the traveling felt, aligned over the annular portion containing the area of caliper variation and providing a cushion of pressurized fluid over the felt;

pressure sensor means, including a plurality of pressure transducers spaced apart one from the other transversely of the direction of felt travel, in spaced adjacency with a selected surface of the felt containing the area of caliper variation, and aligned therewith in the direction of felt travel;

the pressure sensor means including fluid stream pressure sensitive means for detecting the difference in fluid pressure over the felt area containing the area of caliper variation in a downstream portion of the felt not containing the area of caliper variation, said pressure sensitive means producing a signal indicative of the passage of the area of caliper variation past the pressure sensitive means; and signal conditioning means for receiving the signal from the pressure sensitive means and utilizing the signal to determine the cyclic speed of the felt and the rotational speed of a predetermined position of the felt in its looped path of travel.

* * * * *